United States Patent
Buckley

(10) Patent No.: US 6,386,236 B1
(45) Date of Patent: May 14, 2002

(54) METHOD OF PRESTRESSING AND REINFORCING DAMAGED CYLINDRICAL STRUCTURES

(75) Inventor: David L. Buckley, Monrovia, CA (US)

(73) Assignee: Air Logistics Corporation, Pasadena, CA (US)

(*) Notice: Subject to any disclaimer, the term of this patent is extended or adjusted under 35 U.S.C. 154(b) by 56 days.

(21) Appl. No.: 09/585,100

(22) Filed: May 31, 2000

(51) Int. Cl.⁷ ................................................. F16L 55/17
(52) U.S. Cl. .............................................. 138/99; 138/97
(58) Field of Search .................................. 138/97, 98, 99

(56) References Cited

U.S. PATENT DOCUMENTS

| | | | |
|---|---|---|---|
| 3,480,043 A | * 11/1969 | Proudfoot et al. | 138/99 |
| 3,531,345 A | * 9/1970 | Torosian | 138/99 |
| 4,309,990 A | 1/1982 | Brooks et al. | 128/90 |
| 4,357,961 A | * 11/1982 | Chick | 138/99 |
| 4,366,814 A | 1/1983 | Riedel | 128/156 |
| 4,376,438 A | 3/1983 | Straube et al. | 128/90 |
| 4,411,262 A | 10/1983 | von Bonin et al. | 128/90 |
| 4,427,002 A | 1/1984 | Baron et al. | 128/83 |
| 4,427,003 A | 1/1984 | Fennimore et al. | 128/90 |
| 4,433,680 A | 2/1984 | Yoon | 128/90 |
| 4,448,218 A | * 5/1984 | Vetter | 138/99 |
| 4,517,038 A | 5/1985 | Miller | 156/98 |
| 4,519,856 A | 5/1985 | Lazzara | 156/49 |
| 4,655,208 A | 4/1987 | Yoon | 128/156 |
| 4,668,563 A | 5/1987 | Buese et al. | 428/230 |
| 4,779,389 A | 10/1988 | Landers | 52/169.13 |
| 4,918,883 A | 4/1990 | Owen et al. | 52/101 |
| 4,921,585 A | 5/1990 | Molter | 204/72 |
| 5,020,572 A | * 6/1991 | Hunt | 138/99 |
| 5,027,575 A | 7/1991 | Owen et al. | 52/742 |
| 5,030,493 A | 7/1991 | Rich | 428/63 |
| 5,079,824 A | * 1/1992 | Lopez et al. | 138/98 |
| 5,166,007 A | 11/1992 | Smith et al. | 428/63 |
| 5,228,477 A | * 7/1993 | Chirdon et al. | 138/99 |
| 5,301,983 A | * 4/1994 | Porowski | 138/99 |
| 5,333,916 A | * 8/1994 | Burkit et al. | 138/99 |
| 5,388,317 A | * 2/1995 | Johansen et al. | 138/99 |
| 5,388,617 A | * 2/1995 | Sasaki et al. | 138/99 |
| RE35,322 E | 9/1996 | Owen et al. | 52/741.14 |
| 5,632,307 A | 5/1997 | Fawley et al. | 138/99 |
| 5,732,743 A | * 3/1998 | Livesay | 138/99 |
| 6,217,688 B1 | * 4/2001 | Landers | 138/99 |

* cited by examiner

Primary Examiner—James Hook
(74) Attorney, Agent, or Firm—Christie, Parker & Hale, LLP

(57) ABSTRACT

A method of prestressing and reinforcing damaged pipes includes using a resin impregnated substrate, or a fiberglass fabric coated with a resin, to wrap a damaged area of the pipe. In order for the substrate to compress the pipe, the pipe is wrapped tightly. The compressed pipe has a negative hoop stress when the pipe is not under internal pressure. This negative hoop stress offsets the hoop stress due to the internal pressure from the fluid flow, so that the maximum hoop stress of the pipe is not exceeded. In an effort to provide this tightness, a pressurized portion of resin is introduced between the substrate and the pipe. A bladder may be inserted between the pipe and the substrate to contain a functional amount of prestressing resin injected under pressure. The resin used for prestressing can be the same as or different from the resin used to impregnate or coat the fiberglass strips.

27 Claims, 3 Drawing Sheets

METHOD OF PRESTRESSING AND REINFORCING DAMAGED CYLINDRICAL STRUCTURES

FIELD OF THE INVENTION

This invention relates to a method of prestressing and reinforcing damaged pipes and other cylindrical structures. In particular, this invention relates to lowering stress in the damaged pipe by compressing the pipe with a prestressing resin injected between the pipe and a strengthening wrap, thereby effecting a repair and allowing the pipe to operate at design fluid pressure, as well as design flow levels.

BACKGROUND OF THE INVENTION

Pipe systems provide basic utilities to the public, such as water, gas and sewage. These basic utilities are often heavily relied upon by the public. As such, the pipe systems are usually in a state of full operation, i.e. optimal flow rate. There is usually a very limited amount of time that the pipes and pipe systems operate at a reduced flow rate, while not seriously affecting utility service.

Pipelines and other cylindrical structures, whether above ground or below, occasionally suffer damage. Over time, these cylindrical structures can be damaged from rust, corrosion or other degradation. Further, the damage can occur during repair or installation, for example from tool impact or falling debris.

At a damaged area of the pipe, there is a smaller cross-sectional thickness of the pipe. The thickness of the pipe is inversely proportional to the hoop stress of the pipe, that is, the stress due to the operational fluid pressures in the pipe. Accordingly, there is a larger hoop stress in the damaged area as compared to the rest of the pipe.

The hoop stress in the pipe is proportional to the strain in the pipe. Therefore, the larger hoop stress in the damaged area results in a proportionally larger strain. The larger strain in the damaged area of the pipe causes further damage. In order to prevent further breakage or leaking from the structure, the flow through the pipe, and resulting pressure therefrom, is typically reduced or stopped. However, this flow reduction is undesirable because the utility service is correspondingly reduced. Accordingly, a repair method that results in no interruptions of utility service is desired.

It is usually more cost effective to permanently repair the leaking pipe rather than replace it. When the damaged pipe is replaced, the downtime of the system, the labor costs, the material costs, as well as the costs associated with the loss of utility services are usually large.

Cylindrical structures that may need repair may comprise metal, concrete, composites, fiberglass, and plastics, including polyethylene, PVC, polyurethane. However, there is no universal method of pipe repair for these various materials. Composite materials are used to repair steel, copper, and PVC pipes, but there is no current solution for the repair of polyethylene type pipes. This is because traditional epoxy and phenolic resin systems do not adequately adhere to the polyethylene type pipes. Accordingly, a universal method of pipe repair for various materials is desired.

SUMMARY OF THE INVENTION

A pressurized vessel or pipe is operated in a pressurized fluid system. A fluid in the pressurized vessel is intended to be present at a predetermined pressure. The vessel has a wall that has a condition in a localized area that creates a hoop stress that is greater than the pipe's design hoop stress at the design fluid pressure. To prevent further damage to the pipe, a compressive stress is created in the localized area of the vessel wall. The compressive stress is correlated in magnitude to the design amount of tensile stress so that, when the compressive stress is arithmetically combined with the actual tensile stress in the localized area, the total stress is at or near the design amount of tensile stress. As the pipe is near the design level of tensile stress, the fluid can then be present in the vessel at the predetermined design fluid pressure.

The compressive stress in the pipe is accomplished by tightly wrapping a strip of flexible substrate around the localized area of the pipe. The substrate is impregnated with a resin that cures upon contact with an activator, such as moisture, air, water, or an organic solvent or agent. In addition, a prestressing resin is injected under pressure between the substrate and the pipe in the damaged area. If the resin is directly injected between the substrate and the pipe, a mid-section of the substrate that faces the damaged pipe area is provided with tape or the like. The tape is fastened to the inside surface of the substrate so that the substrate does not adhere directly to the pipe, and can be expanded and spaced from the pipe upon the resin injection. Alternatively, a prestressing resin is injected under pressure into a bladder inserted between the substrate and the pipe. The tight wrapping of the substrate around the pipe, in combination with the prestressing resin, subjects the pipe to the desired compression forces, i.e. a negative hoop stress.

BRIEF DESCRIPTION OF THE DRAWINGS

These and other features and advantages of the present invention will become appreciated as the same becomes better understood with reference to the specification, claims and drawings wherein:

DETAILED DESCRIPTION

Figure 1:
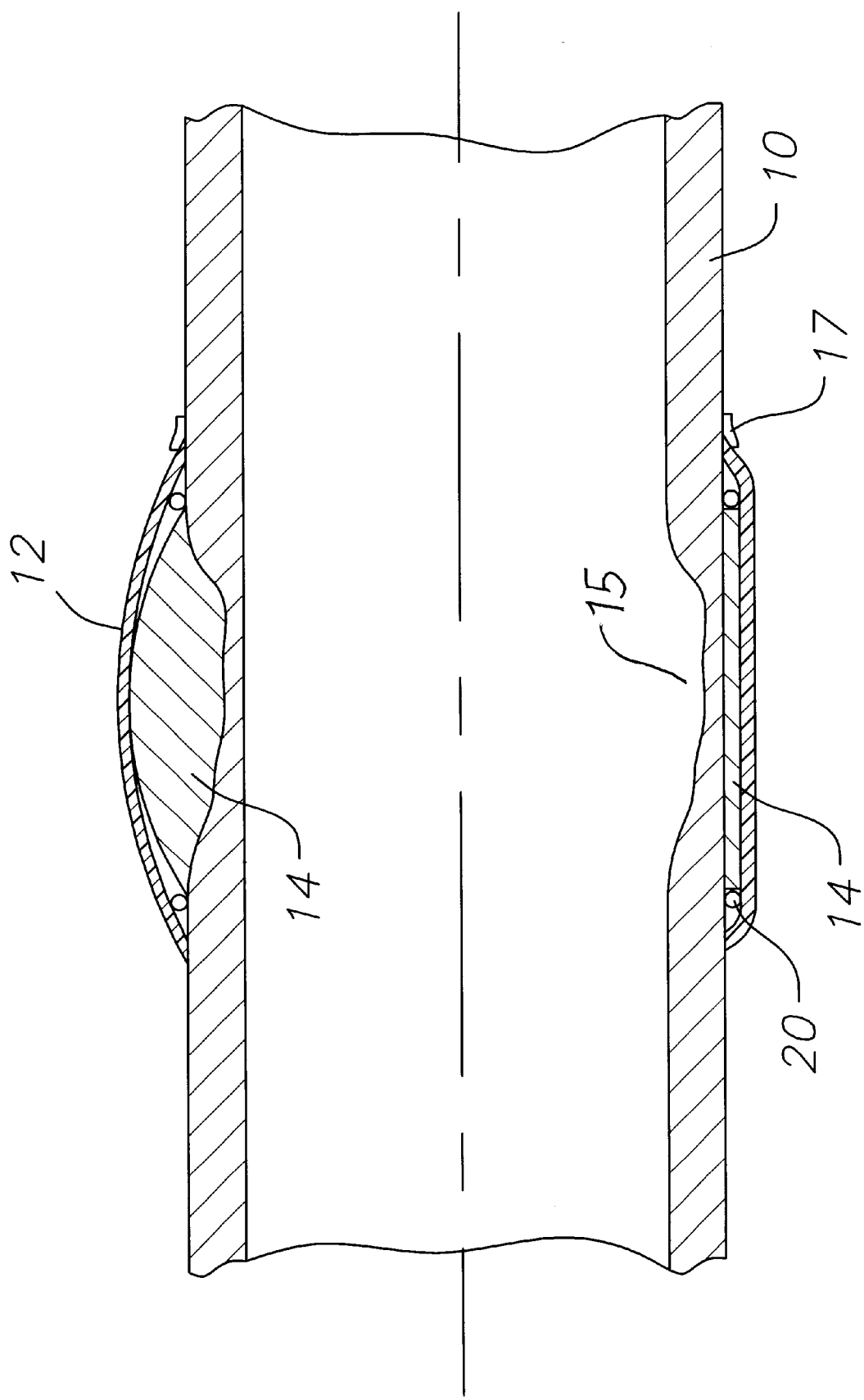
FIG. 1 is a cross-section of a damaged pipe after the substrate and a prestressing resin are applied according to the present invention.

Illustrated in FIG. 1 is a repaired cylindrical structure (or pipe) 10 according to the present invention. A damaged area 15 of the pipe can be either on the inside or the outside of the pipe. As illustrated, a moisture-curable, resin-impregnated substrate 12 surrounds and encompasses the damaged area 15 of the pipe. The substrate is preferably impregnated with a resin that is sticky or tacky. This resin helps adhere the substrate to the pipe while the substrate is pulled tightly around the pipe.

Figure 3:
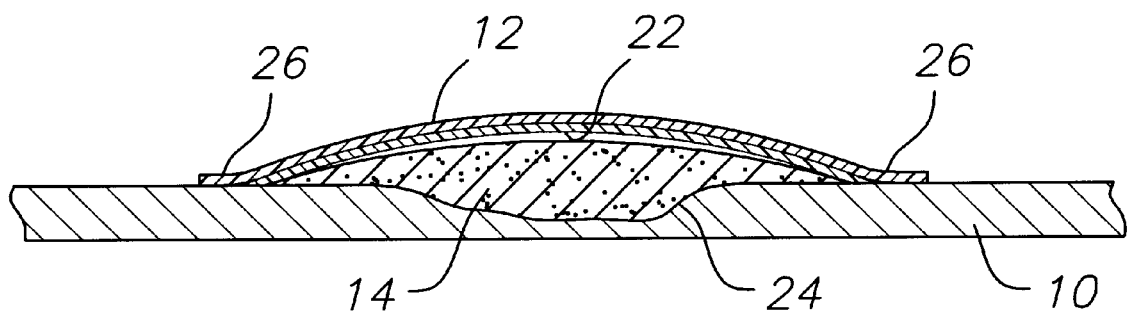
FIG. 3 is a section of a damaged pipe after the substrate, a tape covering, and a prestressing resin are applied according to the present invention.

In one embodiment, for either the internally or externally damaged pipe, a prestressor 14 is injected between the applied substrate and the pipe. A section of substrate that covers the damaged area of the pipe does not adhere to the pipe, so that the prestressor can be injected in between this section and the pipe. In a preferred embodiment, as shown in FIG. 3, a piece of tape 22 is placed on an inside surface of the substrate 12 along the section that covers the damaged area 24. The tape keeps the substrate from adhering to the pipe, so that the substrate can be expanded and spaced from the pipe when the prestressing resin 14 is injected. However, tape is not placed on edges 26 of the substrate, so that the substrate adheres to the pipe on either side of the damaged area.

The prestressor preferably is a hard setting prestressing resin injected in between the substrate and the pipe. The prestressing resin preferably is a two part adhesive. The two part adhesive can be a conventional two part adhesive of the kind often applied by hand to substrates used for construction or concrete damage repair. The prestressing resin can be the same as the resin used to impregnate or coat the substrate, or alternatively, the impregnated resin and the injected resin can have different compositions. The prestressing resin can be injected through the substrate by a hypodermic needle or similar device. Alternatively, the prestressing resin is injected into place between the pipe and the substrate by a pressurizing system (not shown), which includes a check valve to prevent resin backflow. The amount of pressure used for the injected prestressing resin is proportional to the operational pressure in the pipe so that the sum of the forces on the damaged portion of the pipe is low, even zero, when the fluid in the pipe is at design operational pressure.

Figure 4:
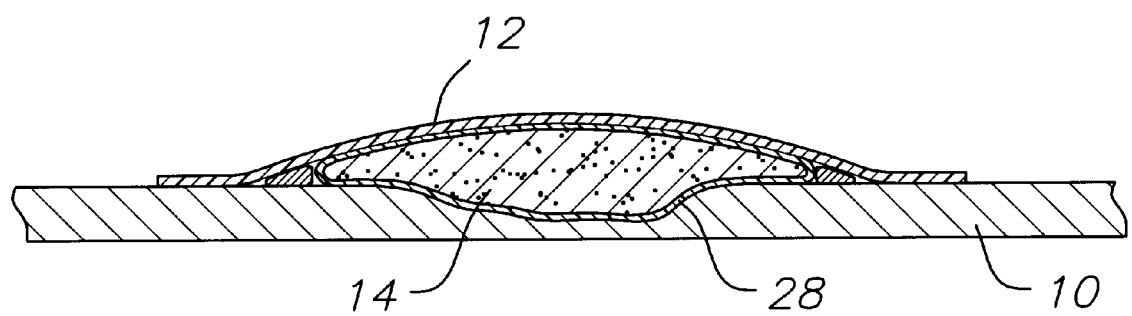
FIG. 4 is a section of a damaged pipe after the substrate covered bladder is filled with the prestressing resin according to the present invention.

In an alternative embodiment, as shown in FIG. 4, the prestressor is a bladder 28 introduced between the substrate 12 and the pipe 10. The bladder preferably is introduced during the process of applying, as by wrapping, the substrate about the pipe. The bladder is injected with a pressurized hard setting prestressing resin 14.

Figure 2:
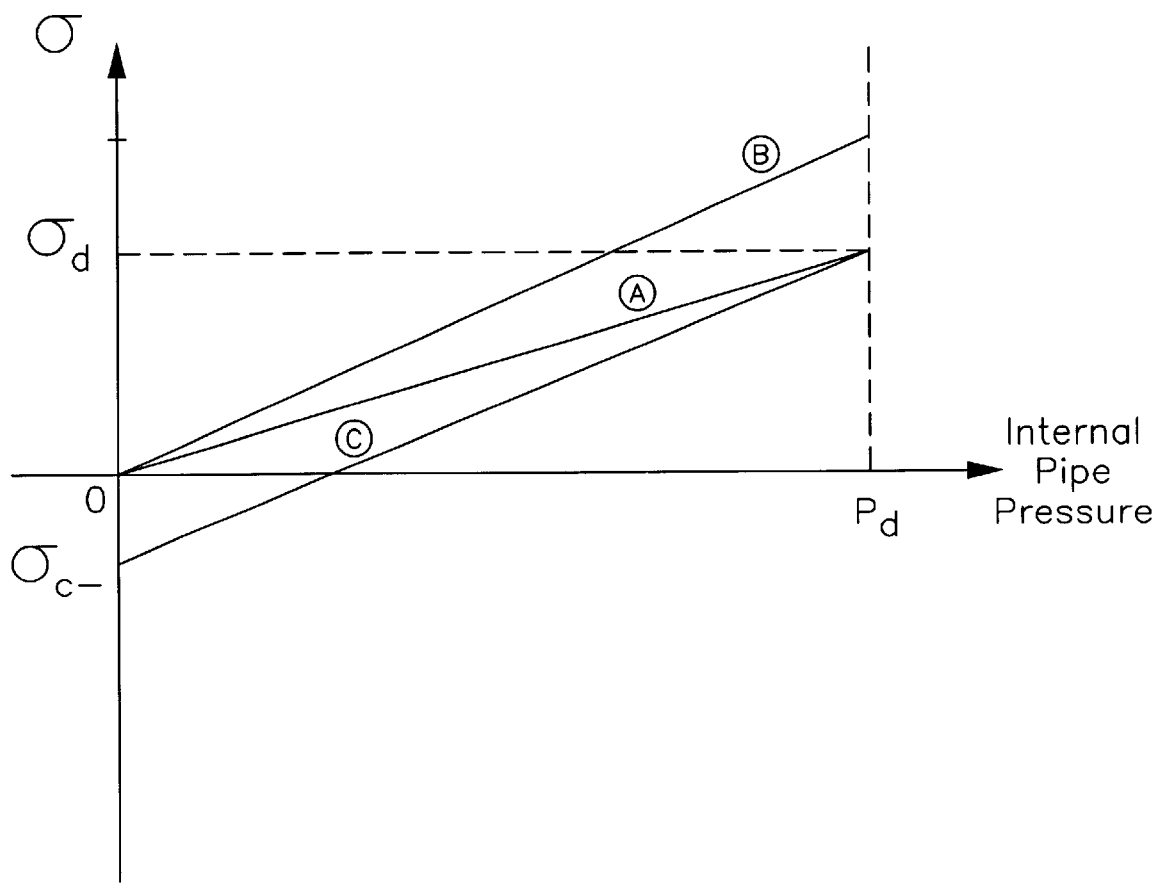
FIG. 2 is a graph which very generally compares the pipe hoop stress versus internal pipe pressure for normal, defective, and repaired pipes.

In response to the pressure of the injected prestressing resin, the substrate expands or strains. The substrate thereby undergoes a corresponding stress, and a compressive stress on the pipe results. In addition, the prestressor, in combination with the substrate increases the cross-sectional area of the pipe at the damaged section, which decreases the hoop stress in the pipe. Further, as the substrate is tightly wrapped about the pipe, the substrate will strain or expand the same amount as the pipe when under fluid pressure. The substrate thereby absorbs some of the hoop stress from the internal pipe pressure. These factors lead to reducing the total hoop stress on the pipe and the substrate taking some amount of the hoop stress. As shown in FIG. 2, the compressive forces of the repair offset the higher hoop stress in the damaged area of the pipe.

In FIG. 2, line A represents the relationship between the internal pipe pressure and the hoop stress of the pipe for a normal pipe wall. At zero pipe pressure, the hoop stress on the pipe is zero. At a design level of the internal pipe pressure $P_d$, the hoop stress is at a corresponding design hoop stress $\sigma_d$.

Line B of FIG. 2 represents the relationship between the internal pipe pressure and the hoop stress of the pipe for a damaged or defective pipe. Again, at zero pipe pressure, the hoop stress on the pipe is zero. Because of the smaller cross-sectional area in the damaged section of the pipe, when the fluid in the pipe is at design operational pressure $P_d$, the hoop stress exceeds the design hoop pressure $\sigma_d$. This greater hoop stress in this damaged area causes even further damage to the defective pipe.

Line C of FIG. 2 represents the relationship between the internal pipe pressure and the hoop stress for a repaired pipe, according to the present invention, that is, a resin injected in between a pipe and a substrate wrapped about the pipe. Surprisingly, at the internal flow pressure of zero, the pipe is prestressed or stressed below zero at hoop stress $\sigma_{c-}$. This is because the substrate and prestressing resin place compressive forces on the pipe, as discussed above. With the repair, the cross-sectional pipe area is made a certain thickness so that at design flow levels, the repaired pipe section is at the design hoop stress. As a result, the defective pipe is not further damaged.

FIG. 2 is intended to illustrate principles and effects. FIG. 2 is not intended to depict any actual relative values.

The portion of hoop stress that the substrate undertakes is directly proportional to the ratio between the modulus of elasticity for the substrate and the modulus of elasticity for the pipe material and to the ratio of the amounts of material in the substrate and in the pipe. The resin-impregnated substrate usually has a Young's modulus of elasticity, that varies between $2 \times 10^6$ lb/in$^2$ and $8 \times 10^6$ lb/in$^2$. The Young's modulus for the substrate is often lower than the modulus of elasticity for the pipe. For example, for a steel pipe, the modulus of elasticity is about $30 \times 10^6$ lb/in$^2$. In this example, the modulus of elasticity of the pipe is up to 15 times greater than the modulus of elasticity of the substrate. Thus, the hoop stress taken by the pipe is also up to 15 times greater than the hoop stress taken by the substrate, assuming equal cross-sectional areas of the pipe and substrate materials.

The preferred resin-impregnated substrate is made available in a vacuum sealed package because it starts to cure when exposed to atmospheric moisture, or immersed in or sprayed with water. As the substrate cures, it generally releases carbon dioxide. Usually, the substrate cures within 30 minutes of contact with water, and within 1 hour of exposure to atmospheric moisture. Preferably, the substrate is exposed to temperatures just above freezing to around 200° F. (93° C.) when curing.

After curing, the resin-impregnated substrate creates a water tight seal. The cured substrate is resistant to rust, corrosion, other chemicals such as fuel, most solvents, most acids, and alkaline substances. Also, the cured substrate is resistant to a broad range of temperatures: from about –55° F. to about 400° F.

Minimal clean up or waste is associated with using substrates pre-impregnated with resin because the resin is premixed, already impregnated into the fabric. Resin-impregnated substrates offer an easily installed system, which is strong, lightweight, long lasting in severe environments, odorless and have environmentally benign reactions upon curing. In any event, due to the chemical nature of the resin impregnated substrate, protective gloves should be used when handling the substrate.

The substrate can have a thickness up to about 0.009". Using a thin material for the substrate is easier to apply in repairing smaller pipes, and easier to apply around joints and couplings because it is more flexible.

When the prestrepsing resin is infected in the bladder during the curing stage, the substrate is flexible enough to be manipulated to tightly fit around the pipe. In alternate embodiments, the prestressing resin is injected in the bladder either before or after the curing stage of the substrate.

However, if the prestressing resin is injected directly in between the substrate and the pipe, the substrate must first be cured. If the prestressing resin is injected before the substrate is cured, the pressurized resin will ooze out of the substrate. Injecting the prestressing resin after curing has certain advantages. In particular, the substrate is already hard coated with the resin, and the substrate is already adhered to adjacent substrate layers and/or sections of the pipe surrounding the damaged area. The amount of stress that the substrate undergoes due to the injection of the prestressing resin is less than the ultimate stress that the cured substrate can withstand without pulling apart from surfaces to which the substrate is adhered. As a result, the substrate will not come lose from the tight wrap as the prestressing resin is injected.

The composite substrate preferably has fibers comprised of fiberglass. E-glass preferably is the glass formulation used in the fiberglass reinforcement. In alternate embodiments, the composite substrate has fibers comprised of aromatic polyamide (aramid), more particularly Kevlar® of duPont (a very strong aramid yarn), carbon, and/or metal, such as steel, titanium. The fibers provide structural strength to the substrate. However, having reinforcing fibers in both the warp direction (the circumferential direction of the pipe) and the weft direction (the weft direction is opposite the warp direction) of the substrate is costly.

Because the hoop stress circumferentially around the pipe is twice the stress in the longitudinal direction, greater structural strength and reinforcement is preferably around the cylindrical pipe rather than along it. Therefore there preferably are more fibers in the wrapped substrate that are substantially parallel to the warp direction of the pipe than those in the fill direction. The E-glass tape fabric hag a warp/weft ratio between 50/50 and 95/5. Preferably, the E-glass tape fabric has a warp/weft ratio between 60/40 and 75/25. The fibers in the longitudinal direction of the substrate substantially correspond to the warp direction of the pipe, when the substrate is wrapped along the pipe with a relatively narrow bias angle (wrapped over a substantial portion of the previously wrapped layer so that the angle between the longitudinal edges of the overlapping layers is small). Consequently, this bias angle provides the maximum benefit of the angle of the substrate fibers. As a result, the substrate need not be applied multiple times in many different angles to provide the required strength in different directions of the repair.

Preferably, the substrate uses specially designed weaves and materials to provide significant strength, stiffness and cost advantages over standard glass cloth. The weave of the fiber has a high density, so that leaks in the material are sealed. The fibers in the fabric can be woven together with a nylon thread. In alternative embodiments, the fibers in the fabric can be braided, or thermally stitched. The process of weaving allows a set of yarns or fibers running in the warp direction to be interlaced with another set of yarns or fibers running across the fill. In one embodiment, crisscross 45 degree patterns and longitudinal stitching are used, so that the fibers are heavily biased in the warp direction.

The substrate fabric is manufactured in large sheet rolls. The substrate fabric is then cut into workable pieces. Either the pieces cut from the middle of the ream or at the end of the ream (called the 'selvage') can be used effectively as the substrate in the present invention.

The substrate (without the resin) can have a weight of about 6 oz to 24 oz per square yard. However, typically the cloth composite (with the resin) is at least about 9 oz per square yard, but not over about 36 oz per square yard.

A preferred resin-impregnated substrate is Aquapreg, a product of Air Logistics Corporation, Pasadena, Calif. and Dallas, Tex. (airlog.com). Aquapreg is a cloth, either woven or nonwoven, with unidirectional fibers impregnated with water-activatable resin. Aquapreg is useful, inter alia, in mold fabrication of structures, structural repairs, and pipe repairs and reinforcements, The resin impregnated in the Aquapreg substrate can be a water activated polyurethane resin.

In an alternative to the substrate being resin-impregnated, the resin is applied to the substrate by hand. However, substrates that are hand-coated with resin usually are associated with large costs and waste. The user tends to mix more resin than is needed, and tends to apply more resin to the substrate than necessary, both of which lead to waste. Additionally, the time that it takes to mix and apply, as well as clean up the resin, leads to large labor costs. Further, resins commonly used for application by hand, e.g. epoxy and phenolics, emit fumes during mixing of the adhesives.

When the bladder is injected with the hard setting prestressing resin, the bladder usually raises the substrate from the pipe surface. As a result, there is likely to be an air pocket at edges surrounding the bladder in between the substrate and the pipe surface. In one preferred embodiment of the invention, at least one tapering spacer 20 is inserted around the bladder before the substrate wrap is applied. The spacer has a shape and thickness such that when the substrate has cured, and the bladder is fully injected with hard setting resin, the area surrounding the bladder is filled with the spacer. In one embodiment, the spacer has a cross-section that is wedge-shaped and tapers away from the bladder. The spacer can be made of any suitable material such as rubber, plastic, composite, metal, etc.

The applied substrate preferably extends a desired distance in both directions along the pipe from the damaged area, so that effect of the repair on the pipe is not concentrated at the damaged area. As shown in FIG. 1, a sealing band 17 can be placed across outer longitudinal edges of the substrate. The sealing band 17 helps to establish and to maintain the seal between the substrate and the pipe. Sections of the substrate may overlap other previously wrapped layers. When the substrate overlaps, the tacky surfaces adhere strongly to each other. However, when the substrate edge lays directly on the pipe, the edge may peel up and compromise the integrity of the repair. To prevent peeling up, the sealing band may be used. The sealing band strongly adheres both to the pipe material and to the substrate. The sealing band is placed circumferentially about the pipe along the longitudinal edge of the substrate, such that about half of the band is on the substrate and about half is on the pipe.

The sealing band can also be used to seal the transverse edges of the substrate to the pipe. For the same reasons as above, the transverse edges of the substrate may peel up from the pipe. However, the transverse edges are more likely to peel up than the longitudinal edges. The hoop stress from the internal pipe pressure causes the tightly wrapped substrate to expand as discussed above. The adherence of the substrate to the pipe is likely not as strong as adherence of the substrate to an underlying substrate layer or a continuous piece of substrate wrapped entirely around the pipe. In situations such as where the damaged pipe is extremely large or partially buried, the substrate may not be wrapped around the entire circumference. When this occurs, the transverse edges are exposed on the pipe surface and have a tendency to peel up. With the sealing band placed along the pipe surface halfway onto the transverse edges of the substrate and halfway on the pipe, the substrate is sufficiently adhered to the pipe. In an alternative embodiment, either the transverse or longitudinal edges of the substrate are secured with epoxy, screws, rivets or the like.

The surface of the damaged area is preferably prepared before applying the substrate to the pipe. The surface is prepared by using emery paper or another substance to clean and/or roughen the damaged area before the substrate is applied in order to improve adhesion.

In the present invention, the substrate neither substantially shrinks nor expands after the prestressing and curing stages. Accordingly, the repair lasts as long as the life of the pipe.

Another advantage of the above described pipe repair is that the pipe can be repaired while under either partial pressure or the then-acceptable operational pressure. There is no need to shut down the flow of fluid through pipe in order to repair the pipe as is usual in pipe repair.

It should readily be understood that the embodiments described and illustrated herein are illustrative only, and are not to be considered as limitations upon the scope of the present invention. Variations and modifications may be made in accordance with the spirit and scope of the present invention. It is understood that the scope of the present invention could similarly encompass other materials that are highly inelastic or resistant to stretch as the substrate. The repair method of the present invention encompasses repairing generally cylindrical structures, such as telephone or utility poles, architectural and industrial support columns, and pipelines. Other structures, with either a regular or an irregular cross-section, can also often be advantageously repaired by wrapping the structure with a flexible reinforcing substrate. Further, the use of the resin impregnated substrate of the present invention is extendable to boat repair and underwater pipe repair, such as use with off-shore rigs. The resin impregnated substrate is workable for about 20 minutes under water, whether fresh or salt water.

What is claimed is:

1. A method of repairing a damaged area of a cylindrical structure while the cylindrical structure is subject to operating loads thereby increasing the hoop stress to the damaged area above a predetermined hoop stress of the undamaged portion of the cylindrical structure, comprising:

covering a damaged area of the cylindrical structure with a strip of a substrate impregnated with a curable resin; and introducing a prestressing resin between the substrate and the cylindrical structure in an amount adequate to provide a compressive stress on the damaged area to counter the increased hoop stress on the damaged area that is over the predetermined hoop stress of the cylindrical structure.

2. The method according to claim 1, further comprising providing a bladder between the substrate and the cylindrical structure into which bladder the prestressing resin is introduced.

3. The method according to claim 2, wherein the prestressing resin is introduced into the bladder after covering the bladder by the substrate.

4. The method according to claim 2, wherein the step of introducing the prestressing resin between the substrate and the cylindrical structure can take place during or after the curing of the resin impregnated substrate.

5. The method according to claim 2, further comprising inserting a tapering spacer around the bladder before the substrate is wrapped around the bladder and the cylindrical structure.

6. The method according to claim 1, wherein the substrate is a fiberglass fabric impregnated with a moisture-curable resin.

7. The method according to claim 6, wherein the pre stressing resin is the same as the resin used to impregnate the fiberglass fabric.

8. The method according to claim 1, wherein the prestressing resin is a two part resin.

9. The method according to claim 1, including wrap ping the substrate completely around the damaged areas of the cylindrical structure at least once.

10. The method according to claim 1, wherein the substrate is made of fibers selected from the group consisting of fiberglass, aromatic polyamide, carbon, and metals, wherein the fibers are woven into both the warp direction and the weft direction.

11. The method according to claim 10, wherein a warp/weft ratio of the fibers is between 50/50 and 95/5.

12. The method according to claim 1, further comprising providing sealing bands to hold edges of the substrate to the cylindrical structure.

13. The method according to claim 1, further comprising attaching a section of tape to a region of the substrate which overlays the damaged area of the cylindrical structure to prevent the substrate from adhering to the damaged area of the cylindrical structure.

14. The method according to claim 1, wherein the substrate is first allowed to cure before the step of introducing the prestressing resin between the substrate and the cylindrical structure.

15. The method according to claim 1, wherein the substrate is provided preimpregnated with the curable resin.

16. A repaired vessel with a wall having a damaged portion and undamaged portions, the vessel having a pressurized fluid flow, the repaired vessel comprising:

a strip of hardened resin impregnated substrate that is wrapped around the damaged portion; and a hardened prestressing resin located between the substrate and the damaged portion of the vessel, wherein a hoop stress of the vessel at the repaired damaged portion is less than or equal to the hoop stress of the vessel at the undamaged portions.

17. The repaired vessel of claim 16, further comprising a bladder between the substrate and the vessel, wherein the bladder is filled with the hardened prestressing resin.

18. The repaired vessel of claim 16, wherein the flexible substrate is a fiberglass fabric impregnated with a moisture-curable resin.

19. The repaired vessel of claim 18, wherein the prestressing resin is the same as the resin used to impregnate the fiberglass strips.

20. The repaired vessel of claim 16, wherein the prestressing resin is a two part resin.

21. The repaired vessel of claim 16, wherein the substrate wraps completely around the damaged portion of the vessel at least once.

22. A method for operating a pressurized fluid system in which fluid is intended to be present at a predetermined pressure in a vessel, the vessel having a wall with a substantially localized weakened area which requires the fluid pressure to be at a reduced pressure correlated to a tensile stress level in the weakened area which pressure is reduced a desired amount from a design tensile stress level, the method comprising the steps of:

creating in the weakened area of the vessel wall a compressive stress by applying pressure to the exterior of the vessel in the weakened area at a level which is correlated in magnitude to the amount of tensile stress reduction adequately when arithmetically combined with actual tensile stress in the weakened area to be not substantially greater than the design tensile level to enable the fluid to be present in the vessel at the predetermined pressure; and presenting the fluid to the vessel at the predetermined pressure.

23. The method according to claim 22, including applying pressure to the exterior of the vessel in said area at a level effective to cause the actual wall tensile stress in said area to be not substantially greater than the design tensile level when fluid is present in the vessel at the predetermined pressure.

24. The method according to claim 22, further including the steps of creating a chamber on the exterior of the vessel which includes the weakened area of the vessel as a portion of the chamber boundary, and pressurizing the chamber.

25. The method according to claim 24, wherein the vessel is a pipe, and creating the chamber includes wrapping the pipe with a resin impregnated substrate.

26. The method according to claim 24, wherein the step of pressurizing the chamber includes filling the chamber with a hardsetting resin in an unhardened state at a selected pressure, and hardsetting the resin.

27. A method of repairing a damaged area of a structure while the structure is subject to operating loads thereby increasing the hoop stress to the damaged area above a predetermined hoop stress of the undamaged portion of the structure, comprising:

provising a bladder which covers the damaged area of the structure;

covering the bladder and the damaged area of the structure with a strip of substrate impregnated with a curable resin; and introducing a prestressing resin into the bladder in an amount adequate to provide a compressive stress on the damaged area to counter the increased hoop stress on the damaged area that is over the predetermined hoop stress of the structure.

* * * * *